US012650169B1

(12) United States Patent
Ghannam et al.

(10) Patent No.: US 12,650,169 B1
(45) Date of Patent: Jun. 9, 2026

(54) SYSTEM AND METHOD FOR INTELLIGENT VEHICLE GEARSHIFT IN CARWASH

(71) Applicant: Ford Global Technologies, LLC, Dearborn, MI (US)

(72) Inventors: Mahmoud Yousef Ghannam, Canton, MI (US); Rami Al Khatib, Dearborn, MI (US); Aed M Dudar, Canton, MI (US); Scott Alan Watkins, Canton, MI (US); John Robert Van Wiemeersch, Novi, MI (US)

( * ) Notice: Subject to any disclaimer, the term of this patent is extended or adjusted under 35 U.S.C. 154(b) by 0 days.

(21) Appl. No.: 19/270,953

(22) Filed: Jul. 16, 2025

(51) Int. Cl.
*F16H 61/18* (2006.01)
*B60Q 9/00* (2006.01)
*F16H 61/16* (2006.01)
*F16H 61/22* (2006.01)

(52) U.S. Cl.
CPC .............. *F16H 61/18* (2013.01); *B60Q 9/00* (2013.01); *F16H 61/16* (2013.01); *F16H 61/22* (2013.01); *F16H 2061/168* (2013.01)

(58) Field of Classification Search
CPC .......... F16H 61/16; F16H 61/18; F16H 61/22; F16H 2061/168
See application file for complete search history.

(56) References Cited

U.S. PATENT DOCUMENTS

| | | | |
|---|---|---|---|
| 9,132,807 B2 * | 9/2015 | Stadler | G05D 1/0255 |
| 11,384,832 B1 * | 7/2022 | Bakalas | F16H 59/08 |
| 2016/0319933 A1 * | 11/2016 | Adams | F16H 63/48 |
| 2025/0136063 A1 * | 5/2025 | Schroeter | B60S 3/04 |

FOREIGN PATENT DOCUMENTS

| | | |
|---|---|---|
| CN | 109703488 A | 5/2019 |
| DE | 102017223109 A1 | 6/2019 |
| DE | 102021209991 A1 | 3/2023 |
| KR | 20200012174 A | 2/2020 |

OTHER PUBLICATIONS

Wash Tec, Guide: Taking an Automatic Vehicle To the Car-Wash, https://www.washtec.com/blog/guide-taking-an-automatic-vehicle-to-the-car-wash/, Sep. 5, 2021, pp. 1-4.

* cited by examiner

*Primary Examiner* — Huan Le
(74) *Attorney, Agent, or Firm* — Frank Lollo; Eversheds Sutherland (US) LLP

(57) ABSTRACT
A vehicle including a first sensor, a second sensor, and a processor is disclosed. The processor may detect a vehicle engagement with a conveyor pulling system associated with a car wash facility. Responsive to detecting the vehicle engagement with the conveyor pulling system, the processor may obtain information associated with a foot pedal position of a foot pedal and a gear selector position of a gear selector from a first sensor and a second sensor, respectively. The processor may verify that the foot pedal is in a released position and the gear selector is in a neutral position based on the obtained information and cause the gear selector to remain in the neutral position while the vehicle is engaged with the conveyor pulling system.

20 Claims, 6 Drawing Sheets

600

602 — Start

604 — Detect a vehicle engagement with a conveyor pulling system

606 — Obtain information associated with a first position of a foot pedal and a second position of a gear selector 608 — Verify that the foot pedal is in released position and the gear selector is in neutral position 610 — Cause the gear selector to remain in the neutral position 612 — Stop

SYSTEM AND METHOD FOR INTELLIGENT VEHICLE GEARSHIFT IN CARWASH

FIELD

The present disclosure relates to vehicles and more specifically to systems and methods to facilitate washing of vehicles in a car wash facility.

BACKGROUND

People often use car wash/auto wash services to quickly clean exterior surfaces of their vehicles. Some car wash stations have conveyors that pull the vehicle along, and then the vehicle is automatically washed by using pressurized water supply system, cleaning agents, and/or the like.

A vehicle user may be requested to perform certain operations when the vehicle enters a car wash station. For example, the vehicle user may have to deactivate automatic vehicle wipers and/or fold side view mirrors when the vehicle enters the car wash station. Further, the vehicle user may activate a vehicle neutral mode when the vehicle may be aligned with or disposed on the conveyor. In certain scenarios, the driver may inadvertently press the vehicle's foot pedal or unintentionally shift the gear selector, which may interrupt the car wash process.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
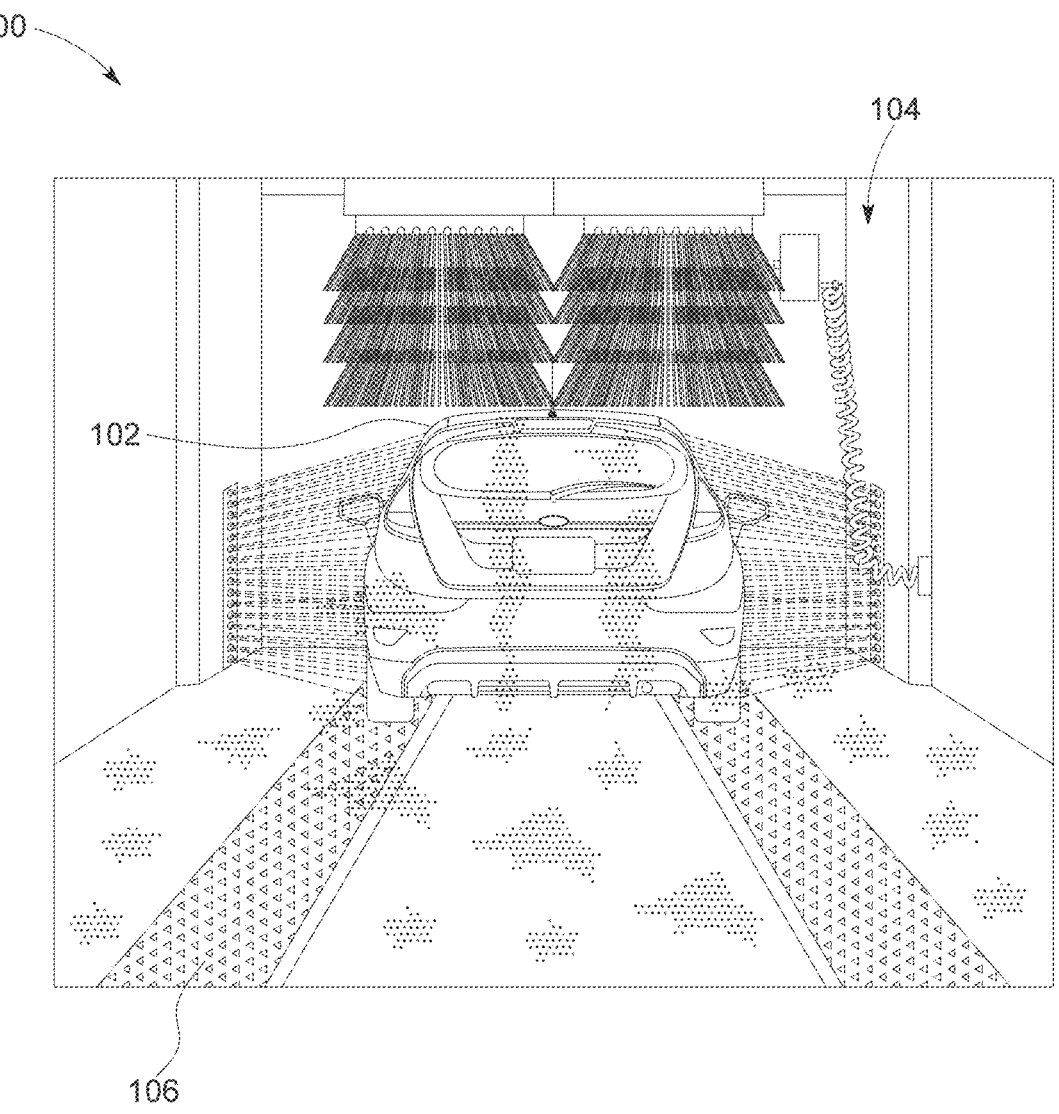
FIG. 1 depicts an environment in which techniques and structures for providing the systems and methods disclosed herein may be implemented.

The present disclosure describes a vehicle management unit ("unit") of a vehicle that prevents inadvertent pressing of the vehicle's foot pedal or unintentional shifting of the vehicle's gear selector when the vehicle is at a car wash facility, thereby preventing interruption in the car wash process and enhancing the car wash experience. In some aspects, the car wash facility may include a conveyor (or a conveyor pulling system) that may automatically pull the vehicle along when the vehicle is engaged with the conveyor. In an exemplary aspect, the conveyor may pull the vehicle through a plurality of areas or zones associated with the car wash facility to facilitate optimal car washing. The plurality of zones may be, for example, a pressurized water supply zone, a cleaning agent zone, a rinse zone, a dry zone, and/or the like.

To perform its operation, the unit may monitor/track the vehicle location and may detect that the vehicle is approaching and/or has entered the car wash facility based on the monitoring. Responsive to detecting that the vehicle has entered the car wash facility, the unit may detect an engagement of the vehicle with the car wash facility (or the conveyor). To detect that the vehicle is engaged with the conveyor, the unit may obtain inputs from vehicle sensors, such as a magnetic sensor (that may detect magnetic markers on conveyor hooks associated with the conveyor), a torque sensor (that may monitor physical forces involved in the vehicle's movement on the conveyor), a microphone (that may capture sounds associated with the vehicle engagement with the conveyor), etc., and may determine that the vehicle is engaged with the conveyor based on the obtained inputs.

Responsive to detecting that the vehicle is engaged with the conveyor, the unit may detect whether the vehicle's foot pedal is in a released position and the gear selector is in a neutral position (which is required to enable the conveyor to pull the vehicle efficiently along the different cleaning zones). To perform such detection, the unit may obtain inputs from a plurality of vehicle sensors, such as foot pedal position sensors, transmission range sensors (TRS), infrared foot position sensors, and/or the like. Responsive to obtaining the inputs, the unit may correlate the inputs from the plurality of vehicle sensors and detect that the foot pedal is in the released position and the gear selector is in the neutral position based on the correlation.

The unit may cause the gear selector to remain in the neutral position while the vehicle is engaged with the conveyor. In some aspects, when the unit detects that the gear selector is not in the neutral position, the unit may automatically position the vehicle in a neutral mode and output/transmit a notification (e.g., via the vehicle's infotainment system or a user device) for the driver indicating that the vehicle is positioned in the neutral mode. The user device may be associated with the driver and may be, for example, a mobile phone, a laptop, a computer, a tablet, a smartwatch, or any other similar device with communication capabilities. The user device may be any device owned by the driver. Alternatively, the unit may transmit an instruction/notification for the driver requesting the driver to position the vehicle in the neutral mode. In further aspects, the unit may lock the gear selector in the locked position, which may prevent the driver from shifting the gear selector. In some aspects, the unit may allow the driver to override and permit the driver to shift the gear selector from the neutral position when the driver tries/attempts to shift the gear selector multiple times (e.g., twice or thrice), thereby balancing security and flexibility.

Furthermore, the unit may monitor the driver's actions in the vehicle interior portion while the vehicle is engaged with the conveyor. The unit may output notifications for the driver when the driver attempts to shift the gear selector while the vehicle is engaged with the conveyor, thereby preventing the driver from shifting the gear selector from the neutral position during the washing process.

In further aspects, the unit may continuously monitor water and soap conditions at the car wash facility by using inputs obtained from vehicle sensors. For instance, the unit may employ infrared spectroscopy sensors, conductivity sensors, optical flow sensors, and/or the like to continuously monitor the water and soap conditions. In some aspects, the unit may monitor the water and soap conditions to detect whether the washing process has started and/or to identify the quality of washing in the car wash facility. In some aspects, the unit may lock the gear selector in the neutral position when the unit detects that the washing process has started. In addition, the unit may cause adjustment of washing parameters (e.g., by transmitting a signal to a computing device associated with the car wash facility) based on the washing quality.

In some aspects, the unit may perform additional actions when the vehicle enters the car wash facility, or before the vehicle enters the car wash facility. These additional actions may include, but are not limited to, automatically disabling the wipers, folding vehicle side view mirrors, rolling-up windows, tucking running boards, and/or the like. Similarly, the unit may perform further actions when the vehicle exits the car wash facility (e.g., when the cleaning process is complete). For example, the unit may re-enable the vehicle wipers, unfold the side view mirrors, etc., when the cleaning process is complete and the vehicle is about to exit the car wash facility. The unit may further unlock the gear selector or take the vehicle out of the neutral mode, to enable the driver to shift the gear selector from the neutral position when the cleaning process is complete and the vehicle is about to exit the car wash facility.

The present disclosure discloses a unit that prevents unintended gear shifts during the car wash process (e.g., by locking the gear selector and/or by monitoring the driver's actions). The unit utilizes multiple existing vehicle sensors in unison and/or vehicle-to-everything (V2X) communication to enhance car wash experience and to prevent interruption in the car wash process. The unit uses the vehicle's Human-Machine Interface (HMI) that outputs real-time animations and status updates and enables voice or gesture controls.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102. The vehicle 102 may take the form of any passenger or commercial vehicle such as a car, a work vehicle, a crossover vehicle, a truck, a van, a minivan, a taxi, etc. The vehicle 102 may be a manually driven vehicle or may be configured to operate in a partially/fully autonomous mode. Further, the vehicle 102 may include any powertrain, such as a gasoline engine, one or more electrically actuated motor(s), or a hybrid system.

The environment 100 may further include a car wash facility 104 (or car wash station). The car wash facility 104 may include a conveyor 106 (or a conveyor pulling system) that may automatically pull the vehicle 102 along, when the vehicle 102 is engaged with the conveyor 106. In an exemplary aspect, the conveyor 106 may pull the vehicle 102 through a plurality of areas or zones associated with the car wash facility 104 to facilitate optimal car washing. The plurality of zones may be, for example, a pressurized water supply zone, a cleaning agent zone, a rinse zone, a dry zone, and/or the like. As the vehicle 102 is pulled through the plurality of zones, soap/cleaning agents, pressurized water and brushes may be applied to the vehicle exterior surface to wash/clean the vehicle 102 (e.g., the vehicle exterior surface). When the vehicle 102 is washed and rinsed, excess water may be dried by using an air dryer or any other known method.

In some aspects, the vehicle 102 may include a car wash management unit or "unit" (shown as car wash management unit 212 in FIG. 2) that may facilitate the car washing in the car wash facility 104. In some aspects, the unit may control the vehicle operations automatically when the vehicle 102 reaches the car wash facility 104. In other aspects, the unit may output one or more notification(s) requesting a vehicle user (or driver) to perform one or more actions (e.g., to control the vehicle operations) when the vehicle 102 reaches the car wash facility 104.

To perform its operation, the unit may monitor/track the vehicle location and may detect that the vehicle 102 is approaching and/or has entered the car wash facility 104 based on the monitoring. In some aspects, the unit may monitor the vehicle geolocation using GPS navigation/signals and determine that the vehicle 102 is approaching or heading towards the car wash facility 104 based on the vehicle geolocation. In further aspects, the unit may obtain inputs from vehicle sensors (e.g., the vehicle camera) to detect that the vehicle 102 is approaching and has entered the car wash facility 104. In addition, or alternatively, the unit may obtain inputs from car wash facility sensors (e.g., cameras) and/or infrastructure sensors via vehicle-to-everything (V2X) communication to detect that the vehicle 102 is approaching and has entered the car wash facility 104.

Responsive to detecting that the vehicle 102 has entered the car wash facility 104, the unit may detect engagement of the vehicle 102 with the conveyor 106. Stated another way, the unit may determine whether the vehicle 102 is engaged with the conveyor 106. To determine whether the vehicle 102 is engaged with the conveyor 106, the unit may obtain inputs (or "first inputs") from vehicle sensors, such as a magnetic sensor (that may detect magnetic markers on conveyor hooks associated with the conveyor 106), a torque sensor (that may monitor physical forces involved in the vehicle's movement on the conveyor 106), a microphone (that may capture sounds associated with the vehicle engagement with the conveyor 106), etc., and may determine that the vehicle 102 is engaged with the conveyor 106 based on the first inputs.

In further aspects, to determine whether the vehicle 102 is engaged with the conveyor 106, the unit may obtain inputs (or "second inputs") from the car wash facility 104 (e.g., sensors and/or a computing device associated with the car wash facility 104) via an established communication protocol (e.g., vehicle-to-everything (V2X) communication or vehicle-to-infrastructure (V2I) communication). The unit may determine whether the vehicle 102 is engaged with the conveyor 106 based on the second inputs. In further aspects, to determine whether the vehicle 102 is engaged with the conveyor 106, the unit may determine a vehicle position relative to the conveyor 106. In some aspects, the unit may determine the vehicle position based on the inputs obtained from one or more of the vehicle exterior cameras, sensors, such as radio detecting and ranging (radar) sensors, light detection and ranging (lidar) sensors, and/or the like, and determine whether the vehicle 102 is engaged with the conveyor 106 based on the vehicle position relative to the conveyor 106.

Responsive to detecting that the vehicle 102 is engaged with the conveyor 106, the unit may detect whether a foot pedal (shown as foot pedal 240 in FIG. 2) is in a released position and a gear selector (shown as gear selector 242 in FIG. 2) is in a neutral position. To perform such detection, the unit may obtain inputs from a plurality of vehicle sensors, such as foot pedal position sensors, transmission range sensors (TRS), infrared foot position sensors, and/or the like. Responsive to obtaining the inputs, the unit may correlate the obtained inputs and detect that the foot pedal is in the released position and the gear selector is in the neutral position based on the correlation. In some aspects, when the unit detects that the gear selector is not in the neutral position, the unit may automatically position the vehicle 102 in a neutral mode and output/transmit a notification (e.g., via the vehicle's infotainment system or a user device associated with the driver) for the driver indicating that the vehicle 102 is positioned in the neutral mode. Alternatively, the unit may transmit an instruction/notification for the driver, requesting the driver to position the vehicle 102 in the neutral mode.

The unit may further detect/determine whether the washing process has started and/or whether the washing process is ongoing. To perform such detection, the unit may employ the vehicle's infrared spectroscopy sensors, conductivity sensors, optical flow sensors, etc. to continuously monitor water and soap conditions associated with the car wash facility 104. The unit may perform a plurality of actions when the washing process is ongoing, as described below.

In an exemplary aspect, the unit may continuously monitor shifting of the gear selector by the driver until the wash process is complete or the vehicle 102 is engaged with the conveyor 106. The unit may continuously monitor the driver's actions when the vehicle 102 is engaged with the conveyor 106 and the washing process is ongoing. The unit may output notifications for the driver when the driver tries to shift the gear selector from the neutral position, to cause the gear selector to remain in the neutral position while the vehicle 102 is engaged with the conveyor 106. In additional aspects, the unit may lock the gear selector in the neutral position while the vehicle 102 is engaged with the conveyor 106 or until the car wash process is ongoing.

In some aspects, the unit may perform additional actions when the vehicle 102 enters the car wash facility 104, or before the vehicle 102 enters the car wash facility 104. These additional actions may include, but are not limited to, automatically disabling the wipers, folding the vehicle's side view mirrors, rolling-up windows, tucking running boards, and/or the like. In additional aspects, the actions may include transmitting/outputting a notification, e.g., via the vehicle's infotainment system or the user device associated with the driver, indicating to the driver that the automatic operation of the wipers has been temporarily disabled and/or the side view mirrors are folded. In alternative aspects, the actions may include transmitting/outputting a notification, via the infotainment system or the user device, requesting the driver to manually turn-off the automatic operation of the wipers and/or fold the side view mirrors.

Similarly, the unit may perform further actions when the vehicle 102 exits the car wash facility 104. For example, the unit may re-enable the vehicle wipers, take the vehicle 102 out of the neutral mode or unlock the gear selector, and unfold the side view mirrors in the manner described above (e.g., automatically or by transmitting instructions for the driver), when the vehicle 102 exits the car wash facility 104.

Further vehicle 102 details are described below in conjunction with FIG. 2.

The vehicle 102 implements and/or performs operations, as described here in the present disclosure, in accordance with the owner manual and safety guidelines. In addition, any action taken by the vehicle user based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

Figure 2:
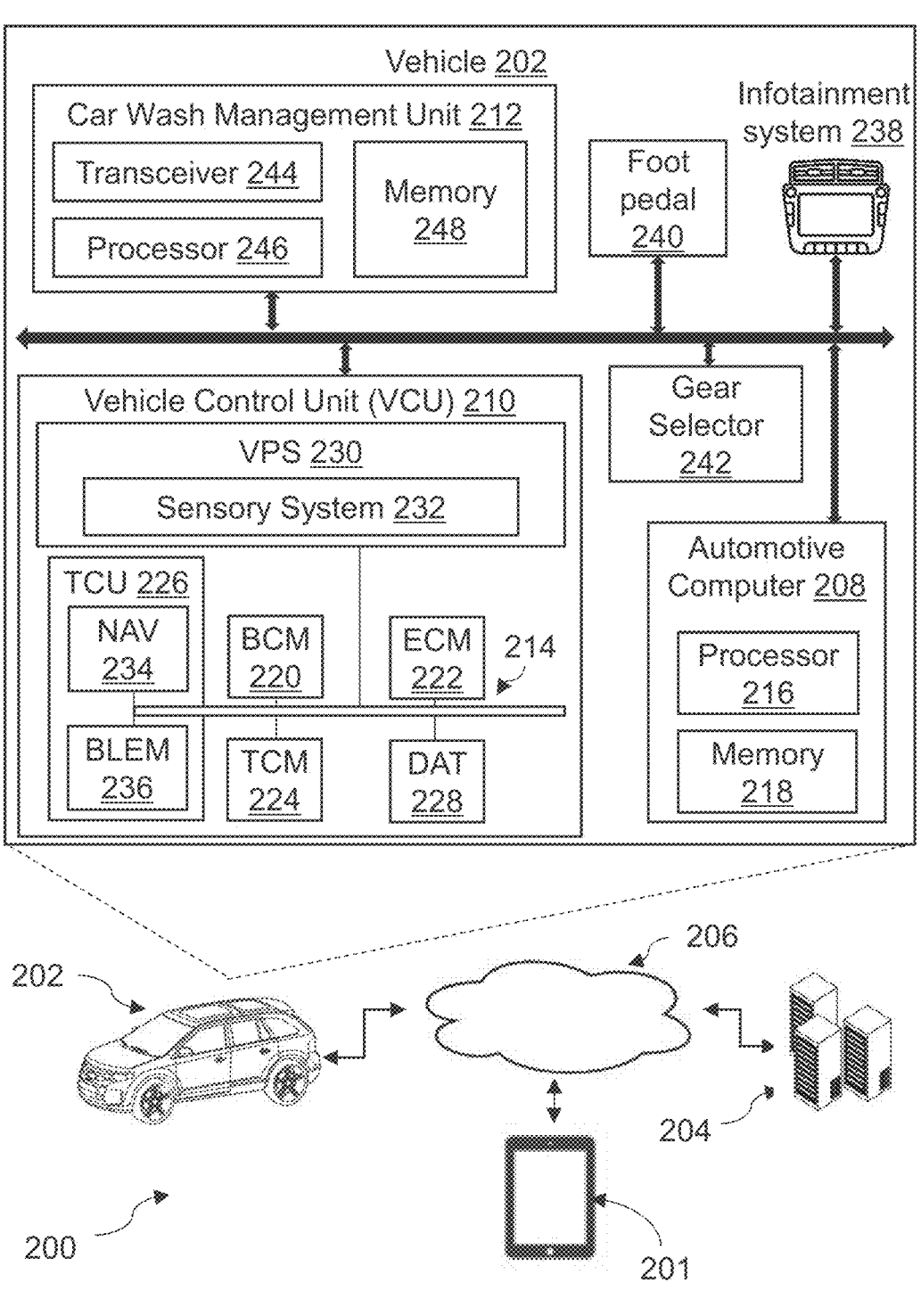
FIG. 2 depicts a block diagram of an example system for controlling an operation of a vehicle in a car wash facility in accordance with the present disclosure.

FIG. 2 depicts a block diagram of an example system 200 for controlling operation of a vehicle 202 in the car wash facility 104 in accordance with the present disclosure. While describing FIG. 2, references will be made to FIG. 3.

The system 200 may include a vehicle 202 that may be the same as the vehicle 102 described above in conjunction with FIG. 1. The system 200 may further include a user device 201 that may be associated with the driver and may be, for example, a mobile phone, a laptop, a computer, a tablet, a smartwatch, or any other similar device with communication capabilities. The system 200 may further include a server 204 that may be communicatively coupled with the vehicle 202 via one or more networks 206. In some aspects, the server 204 may be associated with a firm/operator operating the car wash facility 104 described above in conjunction with FIG. 1. The server 204 may store information associated with a car wash station map or architecture, for example, the location of the conveyor 106, dimensions of the car wash facility 104, a car wash entry point, a car wash exit point, and/or the like. The server 204 may transmit, via the network(s) 206, the information associated with the car wash station map or architecture to the vehicle 202 at a predefined frequency or when the vehicle 202 transmits a request to the server 204 for obtaining such information.

The network(s) 206 illustrates an example communication infrastructure in which the connected devices discussed in various embodiments of this disclosure may communicate. The network(s) 206 may be and/or include the Internet, a private network, public network, or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-Wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 208, a Vehicle Control Unit (VCU) 210, and a car wash management unit 212. The VCU 210 may include a plurality of Electronic Control Units (ECUs) 214 disposed in communication with the automotive computer 208.

The automotive computer 208 may be installed anywhere in the vehicle 202. The automotive computer 208 may be or include an electronic vehicle controller, having one or more processor(s) 216 and a memory 218.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a car wash management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers, and other vehicles (not shown) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging ("lidar") sensor, door sensors, proximity sensors, wheel sensors, ambient weather sensors, vehicle interior and exterior cameras, steering wheel sensors, etc.

In some aspects, the vehicle sensory system 232 may include a first sensor that may detect a position (e.g., a "foot pedal position") of a foot pedal 240 of the vehicle 202. For instance, the first sensor may detect whether the foot pedal 240 is in the released position or the pressed position. In some aspects, the first sensor may be, for example, a foot pedal position sensor, an infrared foot position sensor, and/or the like. The vehicle sensory system 232 may further include a second sensor configured to detect a position (or a "gear selector position") of a gear selector 242 of the vehicle 202. For instance, the second sensor may detect whether the gear selector 242 is in the neutral position. In some aspects, the second sensor may be, for example, a transmission range sensor (TRS).

The vehicle sensory system 232 may further include a third sensor (e.g., vehicle exterior camera) configured to capture images of a surrounding area of a vehicle exterior portion. The vehicle sensory system 232 may further include sensors that may facilitate in detecting the water and soap conditions inside the car wash facility 104. For instance, the vehicle sensory system 232 may include an infrared spectroscopy sensor, conductivity sensors, and optical flow sensors. The vehicle sensory system 232 may further include a Driver Monitoring System (DMS) configured to capture/monitor the driver's actions in the vehicle interior portion.

The vehicle sensory system 232 may include additional sensors that may facilitate in detecting the vehicle's engagement with the conveyor 106. For instance, the vehicle sensory system 232 may include a magnetic sensor that may detect magnetic markers on conveyor hooks associated with the conveyor 106, a torque sensor that may monitor physical forces involved in the vehicle's movement on the conveyor 106, a microphone that may capture sounds associated with the vehicle's engagement with the conveyor 106, and/or the like.

In some aspects, the VCU 210 may control vehicle operational aspects and implement one or more instruction sets stored in the memory 218 and/or the instructions received from the car wash management unit 212.

The TCU 226 may be configured and/or programmed to provide vehicle connectivity to wireless computing systems onboard and off board the vehicle 202 and may include a Navigation (NAV) receiver 234 for receiving and processing a GPS signal, a BLE® Module (BLEM) 236 or BUN (BLE, UWB, NFC module), a Wi-Fi transceiver, a Ultra-Wideband (UWB) transceiver, Low-frequency antennas, remote transceiver module (RTM) antennas, and/or other wireless transceivers/antennas (not shown in FIG. 2) that may be configurable for wireless communication (including cellular communication) between the vehicle 202 and other systems (e.g., the server 204), computers, and modules. The TCU 226 may be disposed in communication with the ECUs 214 by way of a bus.

The ECUs 214 may control aspects of vehicle operation and communication using inputs from human drivers, inputs from an autonomous vehicle controller and/or DAT controller 228, and/or via wireless signal inputs received via the wireless connection(s) from other connected devices, such as user devices, servers (including the server 204), among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, mirrors (e.g., side view mirrors), vehicle gear system (including the gear selector 242), door locks and access control, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system 238. The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may receive user instructions via the touchscreen interface portion and/or display notifications (including visual alert notifications), navigation maps, etc. on the touchscreen interface portion.

The computing system architecture of the automotive computer 208 and the VCU 210 may omit certain computing modules. It should be readily understood that the computing environment depicted in FIG. 2 is an example of a possible implementation according to the present disclosure, and thus, it should not be considered limiting or exclusive.

The vehicle 202 may further include the foot pedal 240 that may control the vehicle speed. The foot pedal 240 may be configured to switch between the released position and the pressed position (e.g., when the driver presses the foot pedal 240). When the foot pedal 240 is in the released position, the foot pedal is up and no braking force is applied. When the foot pedal 240 is in the pressed position, the foot pedal is pushed down, activating the braking system to slow or stop the vehicle 202.

The vehicle 202 may further include the gear selector 242 that may be a mechanical or electronic control that allows the driver or the car wash management unit 212 to select different gear positions in a transmission system. The different gear positions may include a neutral position in which the transmission is disengaged from the vehicle engine. During the washing process, it is desired to maintain the foot pedal 240 in the released position and the gear selector 242 in the neutral position, to enable the conveyor 106 to efficiently move the vehicle 202 along.

The vehicle 202 may further include the car wash management unit 212 (or unit 212), as described above. The unit 212 may include one or more components including, but not limited to, a transceiver 244, a processor 246, and a memory 248, which may be communicatively coupled with each other. In some aspects, the processor 246 and the memory 248 may be the same as or similar to the processor 216 and the memory 218.

The processor 246 may be an Artificial Intelligence (AI) based processor and may be disposed in communication with one or more memory devices, e.g., the memory 248 and/or one or more external databases (not shown in FIG. 2). The processor 246 may utilize the memory 248 to store programs in code and/or to store data for performing various unit operations in accordance with the present disclosure. The memory 248 may be a non-transitory computer-readable medium or memory storing the car wash management program code. The memory 248 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 248 may store computer-executable instructions, and the processor 246 may be configured and/or programmed to execute the stored computer-executable instructions for performing unit functions in accordance with the present disclosure. Specifically, the memory 248 may store computer-executable instructions associated with one or more supervised or unsupervised machine learning algorithms that may enable the processor 246 to perform the unit functions. Examples of machine learning algorithms include, but are not limited to, algorithms associated with Linear Classifiers (Logistic Regression, Naive Bayes Classifier), Nearest Neighbor, Support Vector Machines, Decision Trees, Boosted Trees, Random Forest, hidden Markov Model, and/or Neural Networks.

The transceiver 244 may receive information/inputs from one or more external devices or systems, e.g., the user device 201, the server(s) 204, the car wash facility 104, and/or the like via the network 206. The transceiver 244 may further transmit notifications/data/signals to the external devices or systems. For instance, the transceiver 244 may transmit and receive data signals to the car wash facility 104 via the communication protocol (e.g., V2X communication or V2I communication). In addition, the transceiver 244 may receive information/inputs from vehicle 202 components such as the infotainment system 238, the VCU 210, and/or the like. Further, the transceiver 244 may transmit notifications/command signals to the vehicle 202 components such as the VCU 210, the infotainment system 238, etc.

Figure 3:
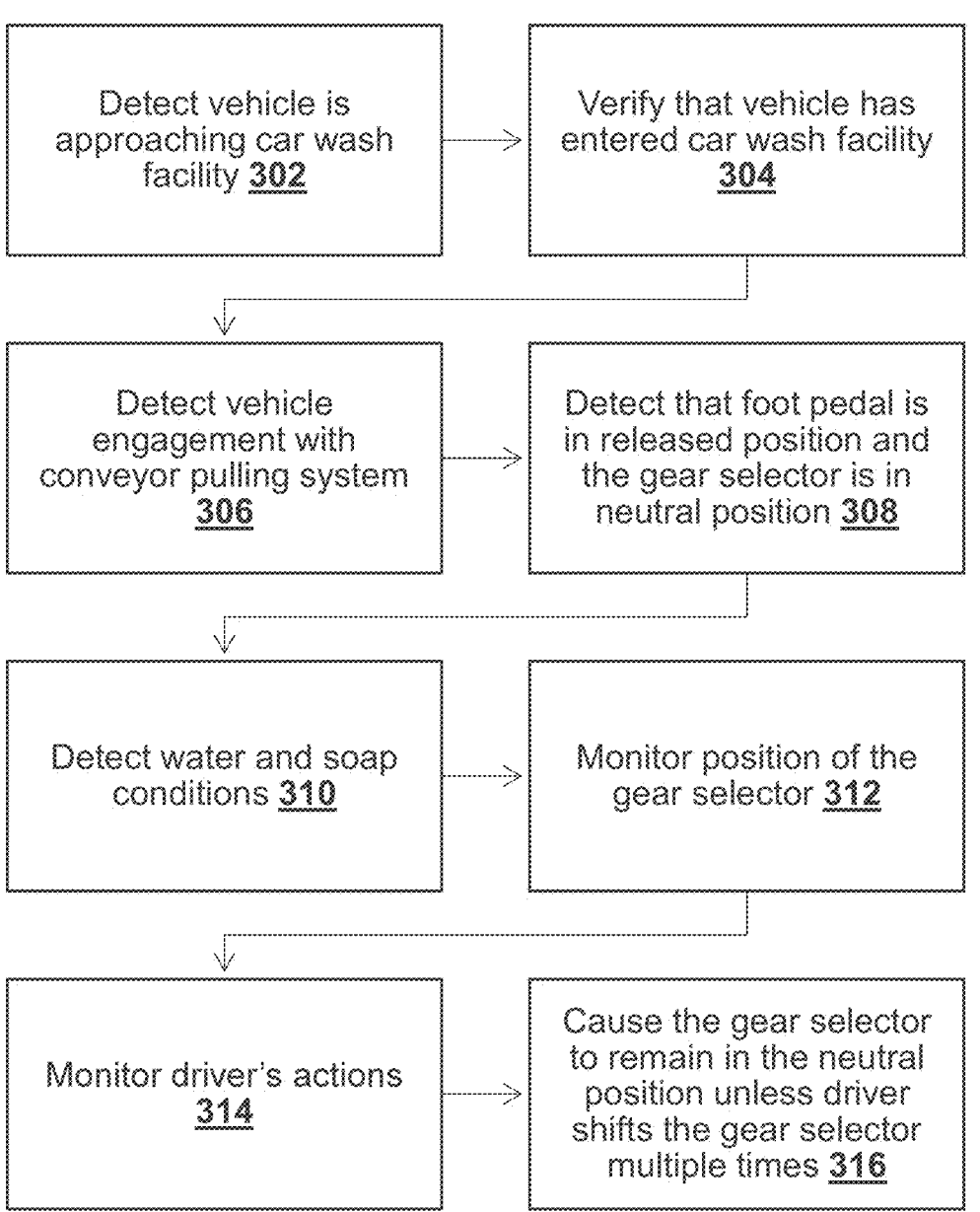
FIG. 3 depicts a flow diagram of an exemplary process to facilitate washing of a vehicle in accordance with the present disclosure.

In operation, the processor 246 may first detect that the vehicle 202 is approaching the car wash facility 104, as shown in step 302 of FIG. 3. In some aspects, to detect that the vehicle 102 is approaching the car wash facility 104, the processor 246 may monitor vehicle geolocation using GPS navigation/signals obtained from the NAV receiver 234 and determine that the vehicle 202 is approaching or heading towards the car wash facility 104 based on the vehicle geolocation. Stated another way, the processor 246 may monitor the vehicle's real-time position to identify that the vehicle 202 is approaching the car wash facility 104. In some aspects, the processor 246 may utilize a dynamic geofencing system with GPS data to determine the vehicle's proximity to the car wash locations. In some aspects, the processor 246 adjusts the geographical attributes of various car wash facilities and ensures that new locations are added to the memory 248. Such automation streamlines the initiation process, eliminating the need for manual driver input and reducing the potential for errors.

In further aspects, the processor 246 may obtain inputs from the vehicle sensors (e.g., the vehicle camera) to detect that the vehicle 202 is approaching the car wash facility 104. In addition, or alternatively, the processor 246 may obtain inputs from the car wash facility 104 or infrastructure sensors via vehicle-to-everything (V2X) communication to detect that the vehicle 202 is approaching the car wash facility 104.

Responsive to detecting that the vehicle 202 is approaching the car wash facility 104, the processor 246 may verify that the vehicle 202 has entered the car wash facility 104, as shown in step 304 of FIG. 3. The processor 246 may utilize the vehicle sensory system 232 and/or inputs obtained via V2X communication to verify that the vehicle 202 has entered the car wash facility 104, as described below.

In an exemplary aspect, the processor 246 may obtain inputs (e.g., images) from the vehicle cameras (such as the front facing camera), responsive to detecting that the vehicle 202 is approaching the car wash facility 104. The vehicle camera may be equipped with Artificial Intelligence (AI)/ Machine learning (ML) visual recognition, which may facilitate the processor 246 to detect and verify that the vehicle 202 has entered the car wash facility 104. Such vehicle cameras may identify specific car wash elements such as signs, gates, conveyor, etc.

The processor 246 may further utilize V2I communication to complement the visual recognition to verify that the vehicle 202 has entered the car wash facility 104. Specifically, the processor 246 may obtain real-time confirmation entry into the car wash facility 104 from the car wash facility 104 via V2I communication, thereby creating a robust system for initiating a washing process. In such scenarios, the transceiver 244 may receive inputs from the car wash facility 104 (e.g., computing device associated with the car wash facility 104), via V2I communication, responsive to detecting that the vehicle 202 is approaching the car wash facility 104. The processor 246 may obtain the inputs from the transceiver 244 and verify that the vehicle 202 has entered the car wash facility 104 based on the obtained inputs. In further aspects, the processor 246 may obtain inputs from the driver via the infotainment system 238 and/or the user device 201 and detect that the vehicle 202 has entered the car wash facility 104 based on the driver's inputs.

Responsive to detecting/verifying that the vehicle 202 has entered the car wash facility 104, the processor 246 may detect or verify the vehicle engagement with the conveyor 106, as shown in step 306 of FIG. 3. The processor 246 may detect or verify the vehicle engagement with the conveyor 106 by using a multi-sensor approach (e.g., by using the vehicle sensory system 232). The processor 246 may obtain inputs from a plurality of sensors, correlate the different inputs, and detect or verify that the vehicle 202 is engaged with the conveyor 106 based on the correlation. Such multi-sensor approach may enable the processor 246 to correctly detect/verify that the vehicle 202 is engaged with the conveyor 106, thereby preventing errors that may disrupt the washing process. For instance, the processor 246 may determine a probability that the vehicle 202 is engaged with the conveyor 106 from each sensor and may calculate an average probability from the different probabilities. The processor 246 may detect that the vehicle 202 is engaged with the conveyor 106 when the average probability is greater than a threshold value.

As an example, the processor 246 may obtain "first inputs" from the magnetic sensor that may read magnetic markers on the conveyor hooks associated with the conveyor 106 and detect the vehicle engagement with the conveyor 106 based on the first inputs. When the magnetic sensor senses/reads the magnetic markers, the processor 246 may detect/verify that the vehicle 202 is engaged with the conveyor 106. As another example, the processor 246 may obtain "second inputs" from the torque sensor that may monitor physical forces involved in the vehicle's movement on the conveyor 106 and detect the vehicle engagement with the conveyor 106 based on the second inputs. As yet another example, the processor 246 may obtain "third inputs" from the microphone that may capture sounds associated with the vehicle engagement with the conveyor 106 and detect the vehicle engagement with the conveyor 106 based on the third inputs.

Responsive to detecting/verifying that the vehicle 202 has engaged with the conveyor 106, the processor 246 may detect or verify that the foot pedal 240 is in the released position and the gear selector 242 is in the neutral position, as shown in step 308 of FIG. 3. To detect or verify that the foot pedal 240 is in the released position and the gear selector 242 is in the neutral position, the processor 246 may obtain information/inputs associated with the positions of the foot pedal 240 and the gear selector 242 from the vehicle sensory system 232 (e.g., the first sensor and the second sensor described above). The processor 246 may then correlate the information/inputs obtained from the first sensor and the second sensor and detect or verify that the foot pedal 240 is in the released position and the gear selector 242 is in the neutral position based on the correlation. For instance, the processor 246 may determine a probability that the foot pedal 240 is in the released position and the gear selector 242 is in the neutral position based on readings obtained from each sensor and may calculate an average probability from the different probabilities. The processor 246 may detect that the foot pedal 240 is in the released position and the gear selector 242 is in the neutral position when the average probability is greater than a threshold value.

In a scenario when the processor 246 detects that the vehicle 202 has engaged with the conveyor 106 and the foot pedal 240 is not in the released position and/or the gear selector 242 is not in the neutral position, the processor 246 may output an instruction/notification for the driver via the infotainment system 238 or the user device 201 requesting the driver to place the vehicle 202 in the neutral mode and/or remove the driver's foot from the foot pedal 240. Alternatively, the processor 246 may transmit an instruction to the ECU 214 to automatically position the vehicle 202 in the neutral mode. In this case, the processor 246 may further transmit a notification to the driver via the infotainment system 238 or the user device 201 indicating that the vehicle 202 is placed in the neutral mode. In some aspects, the processor 246 may detect a drivetrain configuration of the vehicle 202 when the processor 246 detects that the vehicle 202 has engaged with the conveyor 106. Based on the drivetrain configuration, the processor 246 may automatically shift the gear selector 242 to the neutral position (when the gear selector 242 is not in the neutral position). The processor 246 may perform the automatic shift after determining that the vehicle 202 is Rear-Wheel Drive and/or Forward-Wheel Drive, and whether the vehicle 202 is engaged with the conveyor 106.

Further, responsive to detecting/verifying that the vehicle 202 has engaged with the conveyor 106 (or responsive to detecting/verifying that the vehicle 202 has entered the car wash facility 104), the processor 246 may perform additional actions. In some aspects, these additional actions may include disabling/turning-off the automatic operation of the wipers. For example, the processor 246 may transmit instructions to the BCM 220 to turn-off the wipers. The processor 246 may further output/transmit (e.g., via the transceiver 244) a notification for the driver via the infotainment system 238 or the user device 201 responsive to disabling the vehicle wiper operation. The notification may indicate to the driver that the processor 246 has turned off the wipers. In another aspect, the additional action may include transmitting/outputting a notification for the driver, via the infotainment system 238 or the user device 201, requesting the driver to manually turn-off the wipers. The driver may view/hear the notification and accordingly turn-off the wipers.

In a similar manner, the processor 246 may automatically fold the side-view mirrors and close the vehicle windows. In this case, the processor 246 may transmit an instruction to the BCM 220 to fold the mirrors and close the windows. Alternatively, the vehicle 202 may output an instruction for the driver, via the infotainment system 238 or the user device 201, requesting the driver to manually fold the side-view mirrors and close the vehicle windows.

In further aspects, the processor 246 may detect that the car washing process has initiated and perform additional actions responsive to such detection. To detect whether the washing process is initiated, the processor 246 may obtain inputs from the vehicle sensory system 232 and/or from the car wash facility 104 (via V2X communication) and use these inputs to detect that the washing process is initiated. For instance, the processor 246 may obtain images from the vehicle's exterior cameras and detect that the washing process is initiated based on the images obtained from the vehicle cameras.

In additional aspects, to detect that the washing process is initiated, the processor 246 may detect the water and soap conditions associated with the car wash station 104, as shown in step 310 of FIG. 3. For instance, the processor 246 may detect whether the water and soap are applied to the vehicle 202 at the step 310. In addition, the processor 246 may identify the chemical composition, conductivity, the movement of water and foam, to confirm that the washing process is initiated. To detect the water and soap conditions, the processor 246 may obtain inputs from the vehicle's infrared spectroscopy sensor, conductivity sensors, optical flow sensors, and/or the like, and detect the water and soap conditions based on the obtained inputs.

As described above, the processor 246 may detect/identify that the washing process is initiated based on the water and soap conditions. The detection of the water and soap conditions may further ensure that the washing process is thorough and efficient. In some aspects, the processor 246 may cause adjustment of the washing parameters based on the water and soap conditions (e.g., by transmitting feedback to the car wash facility 104, via V2X communication).

Responsive to detecting/identifying that the washing process is initiated, the processor 246 may monitor the position of the gear selector 242, as shown in step 312 of FIG. 3. Stated another way, the processor 246 may monitor whether the gear selector 242 is in the neutral position. To perform the monitoring, the processor 246 may obtain the inputs from the second sensor described above at a predefined frequency until the vehicle 202 is engaged with the conveyor 106 and use the obtained inputs to monitor the gear selector's position.

In further aspects, the processor 246 may monitor the driver's actions by using the inputs obtained from the vehicle sensory system 232 (as shown in step 314 of FIG. 3) responsive to detecting/identifying that the washing process is initiated, to ensure that the gear selector 242 remains in the neutral position while the vehicle 202 is engaged with the conveyor 106. In some aspects, to monitor the driver's actions, the processor 246 may obtain inputs from the vehicle sensory system 232 (e.g., the driver monitoring system) at a predefined frequency. The processor 246 may monitor the driver's actions based on the inputs obtained from the driver monitoring system.

In further aspects, the processor 246 may cause the gear selector 242 to remain in the neutral position while the vehicle 202 is engaged with the conveyor 106, as shown in step 316 in FIG. 3. In some aspects, as described above, the processor 246 may monitor the driver's actions until/while the vehicle 202 is engaged with the conveyor 106. Based on the monitoring of the driver's action, when the processor 246 determines that the driver is shifting or trying to shift the gear selector 242 from the neutral position, the processor 246 may output a notification for the driver to prevent the driver from shifting the gear selector 242, thereby causing the gear selector 242 to remain in the neutral position. For example, the processor 246 may output a notification stating, "do not shift the gear selector as the car wash is ongoing". The processor 246 may output the notification on the infotainment system 238 and/or the user device 201.

In further aspects, to cause the gear selector 242 to remain in the neutral position, the processor 246 may lock the gear selector 242 in the neutral position while the vehicle 202 is engaged with the conveyor 106 (e.g., using a shift lock solenoid), to prevent intended gear shifts during the washing process.

In some aspects, the processor 246 may lock the gear selector 242 in the neutral position while the vehicle 202 travels the entire length of the conveyor 106. In some aspects, the processor 246 may obtain inputs from the car wash facility 104 or the server 204, via the transceiver 244 (e.g., using V2X communication) to estimate the conveyor's length. The inputs may include information associated with the car wash facility infrastructure (e.g., dimensions of the car wash facility 104). Based on the dimensions, the processor 246 may estimate or establish the length of the conveyor 106. For instance, when the processor 246 obtain the length of the car wash facility 104 is around 100 feet, the processor 246 may establish that the length of the conveyor 106 may be 80 to 90 feet (about 80% to 90% of total car wash facility length).

Responsive to estimating or establishing the conveyor length, the processor 246 may determine a distance traveled by the vehicle 202 inside the car wash facility 104. As the vehicle 202 wheels spin, the dead reckoning estimates the vehicle position and the distance traveled by using the inputs obtained from the vehicle sensory system 232 without relying on external signals like GPS. In this case, the ABS wheel speed sensors measure how much each wheel has rotated. The processor 246 may determine the distance traveled by using the dead reckoning and the ABS wheel speed sensors.

The processor 246 may then correlate the distance traveled with the conveyor length. For instance, the processor 246 may determine whether the vehicle 202 has traveled the distance equivalent to the conveyor length. The processor 246 may estimate that the vehicle 202 is engaged with the conveyor 106 based on this correlation. For instance, the processor 246 may determine that the vehicle 202 is engaged with the conveyor 106 when the distance traveled by the vehicle 202 is less than the conveyor length. On the other hand, the processor 246 may determine that the vehicle 202 may not be engaged with the conveyor 106 when the distance traveled by the vehicle 202 is equivalent to or greater than the conveyor length. The processor 246 may lock the gear selector 242 (or cause the gear selector 242 to remain) in the neutral position while the vehicle 202 is engaged with the conveyor 106.

In some aspects, the processor 246 may allow the driver to override and permit the driver to shift the gear selector 242 from the neutral position when the driver tries/attempts to shift the gear selector 242 multiple times (as shown in step 316 of FIG. 3), thereby balancing security and flexibility. In such situations, the processor 246 may obtain a plurality of trigger signals (or more than one trigger signal) from the driver to enable shifting of the gear selector 242 and cause the gear selector 242 to shift responsive to obtaining the plurality of trigger signals. For instance, the processor 246 may enable the driver to shift the gear when the driver shifts the gear selector 242 twice or thrice, and upon confirming that the driver desires to override.

In some scenarios, the washing process may be interrupted (e.g., when the driver shifts the gear selector 242 during the wash without any confirmation). In such cases, the processor 246 may detect that the washing process is interrupted (e.g., based on error message received from the car wash facility 104, when the driver shifts the gear selector 242 from the neutral position during the washing process), and upon such detection, the processor 246 may cause the gear selector 242 to re-engage in the neutral position until the washing process is complete, provided that the vehicle 202 remains stationary. This ensures the continuity of wash and reduces the need for manual intervention.

In further aspects, the processor 246 may determine that the vehicle 202 may be exiting the car wash facility 104 (e.g., after getting washed/cleaned) based on the inputs obtained from the vehicle sensory system 232 and/or from the car wash facility 104 (via V2X communication). For example, the processor 246 may obtain inputs from the vehicle's rear-view camera and may use the AI/ML algorithm to determine that the vehicle 202 may be exiting the car wash facility 104. In addition, the processor 246 may use the information associated with the car wash station map/architecture (that the processor 246 obtains from the server 204 or the car wash facility 104) and the obtained images to determine that the vehicle 202 may be exiting the car wash facility 104.

Responsive to a determination that the vehicle 202 may be exiting the car wash facility 104, the processor 246 may perform one or more additional actions. For example, the processor 246 may unlock the gear selector 242 to enable the driver to shift the gear selector 242 from the neutral position. In addition, the processor 246 may re-enable the wipers or turning ON the wipers and unfold the side view mirrors when the vehicle 202 exits the car wash facility 104. The processor 246 may further transmit a notification to the driver via the infotainment system 238 or the user device 201 indicating that the gear selector 242 is now unlocked, the automatic operation of the wipers is enabled, and the side view mirrors are unfolded. In another aspect, the processor 246 may transmit an instruction to the driver (via the infotainment system 238 or the user device 201) requesting the driver to manually shift the gear selector 242 from the neutral position, turn-on the automatic operation of the wipers, and unfold the side view mirrors.

Figure 4:
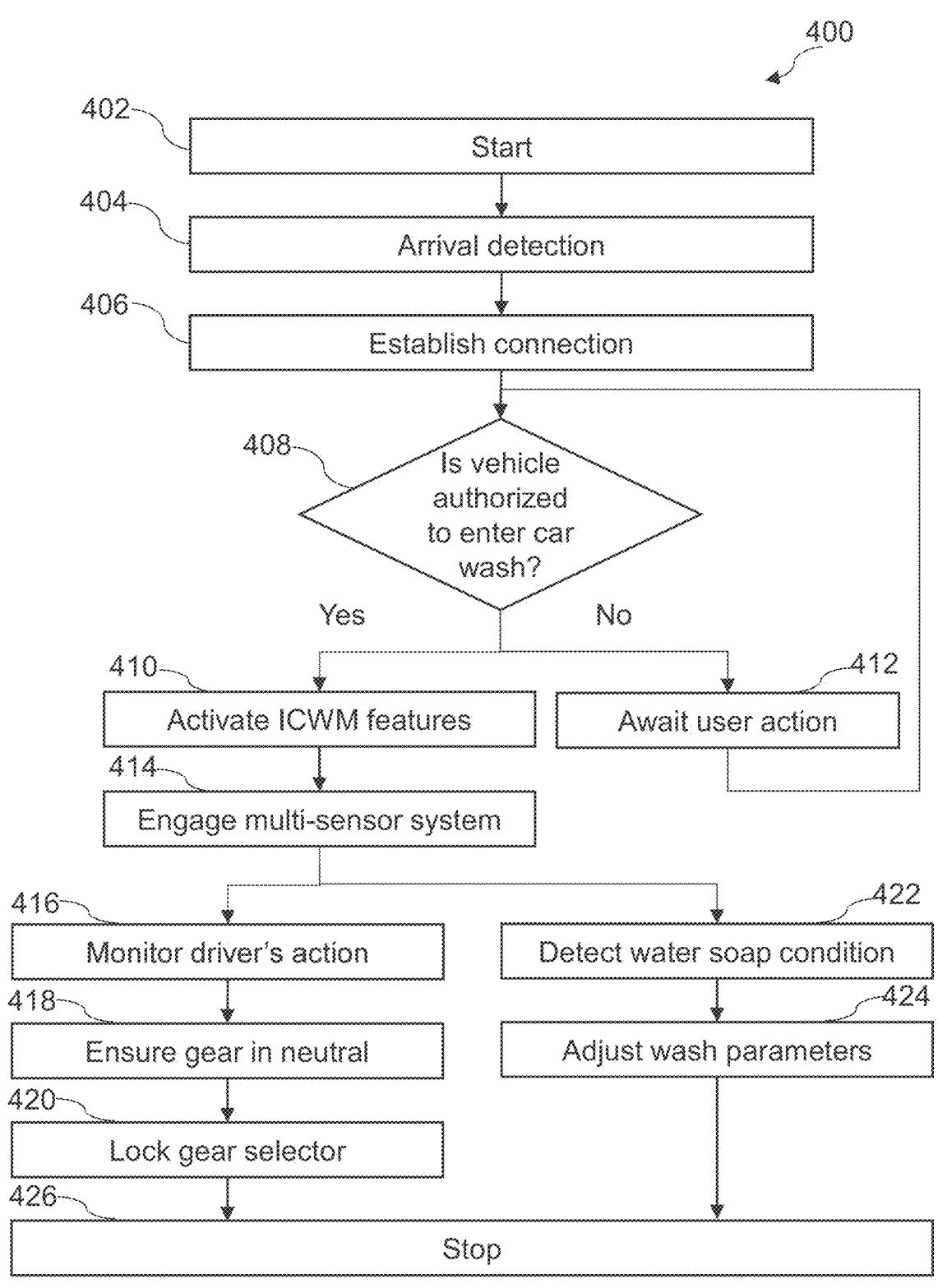
FIG. 4 depicts a flow diagram of a first example method to facilitate washing of a vehicle in accordance with the present disclosure.

FIG. 4 depicts a flow diagram of a first example method 400 to facilitate washing of the vehicle 102, in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include arrival detection in which the processor 246 may detect/determine that the vehicle 102 is approaching and has entered the car wash facility 104, as described above in conjunction with FIG. 2. At step 406, the method 400 may include establishing connection between the vehicle 102 and the car wash facility 104. In some aspects, the processor 246 may establish the communication connection with the car wash facility 104 (e.g., a car wash controller associated with the car wash facility 104) via V2X communication (or the network 206).

At step 408, the method 400 may include determining whether the vehicle 102 is authorized to enter the car wash facility 104. In some aspects, the car wash facility 104 (e.g., the car wash controller) may determine whether the vehicle 102 is authorized to use/enter the car wash facility 104. For instance, the car wash facility 104 may obtain images of the vehicle's license plate (e.g., from the car wash sensor/camera located in the car wash facility 104) and perform license plate recognition to extract the vehicle's license plate number. The car wash facility 104 may then cross-reference the license plate number against a database of registered users or pre-paid accounts associated with the car wash facility 104. The car wash facility 104 may determine that the vehicle 102 is authorized to use the car wash facility 104 when the vehicle's license plate number is present in the database of registered users or pre-paid accounts. Otherwise, the car wash facility 104 may determine that the vehicle 102 is unauthorized when the license plate number is absent from the database.

In addition, or alternatively, the car wash facility 104 may receive a Vehicle Identification Number (VIN) from the vehicle 102 (e.g., the transceiver 244), via V2X communication. The car wash facility 104 may use the VIN to determine that the vehicle 102 is authorized or not (in the same manner as the car wash facility 104 uses the vehicle's license plate number to confirm the vehicle's authorization).

In further aspects, the car wash facility 104 may prompt the vehicle user to provide a confirmation code or additional details (e.g., via the infotainment system 238 or the user device 201) to ascertain whether the vehicle 102 is authorized to use the car wash facility 104.

When the car wash facility 104 determines that the vehicle 102 is authorized, the car wash facility 104 may transmit a confirmation signal to the processor 246 (via the transceiver 244). The processor 246 may receive the confirmation signal and activate an intelligent car wash mode (ICWM) feature, as shown in step 410. On the other hand, when the car wash facility 104 determines that the vehicle 102 is unauthorized, the car wash facility 104 may await user action to authorize the vehicle 102, as shown in step 412.

Responsive to activating the ICWM feature, the processor 246 may engage the multi-sensor system (or the vehicle sensory system 232), as shown in step 414. When the multi-sensor system is engaged, the processor 246 may perform various actions. For instance, the processor 246 may monitor the driver's actions to maintain the correct operational state of the vehicle 102, as shown in step 416. In some aspects, the processor 246 may monitor the driver's action by using the driver monitoring system to ensure that the gear selector 242 is in the neutral position, as shown in step 418. At step 420, the processor 246 may lock the gear selector 242 in the neutral position until the washing process is complete (or while the vehicle 102 is engaged with the conveyor 106), as described above in conjunction with FIG. 2.

In further aspects, the processor 246 may detect the water and soap conditions by using the inputs obtained from the vehicle sensory system 232, as shown in step 422. The processor 246 may then adjust the washing parameters based on the detection of the water and soap conditions, as shown in step 424. At step 426, the method 400 may stop.

Figure 5:
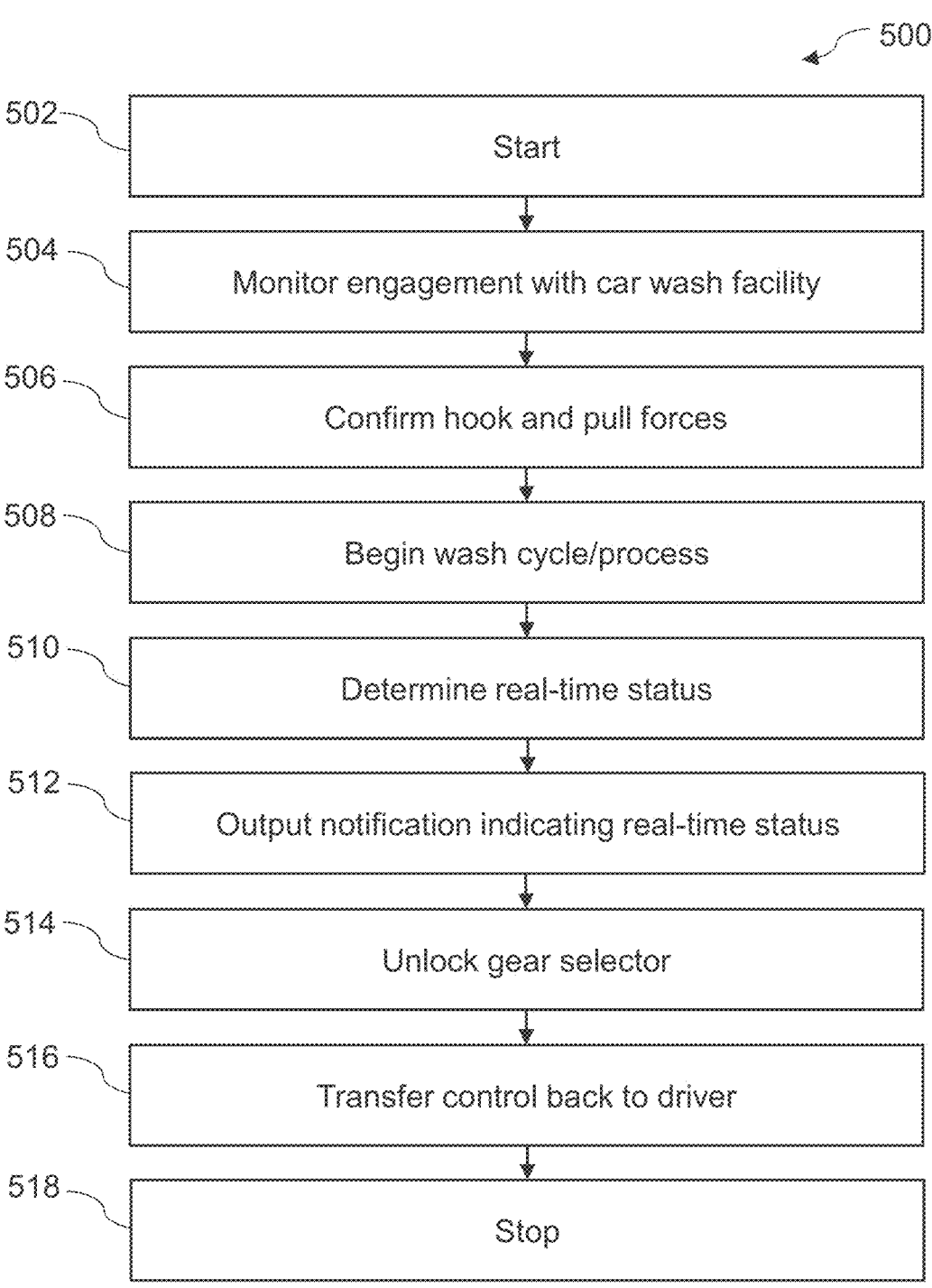
FIG. 5 depicts a flow diagram of a second example method to facilitate washing of a vehicle in accordance with the present disclosure.

FIG. 5 depicts a flow diagram of a second example method 500 to facilitate washing of the vehicle 102, in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 may be an extension of the method 400. The method 500 may begin when the processor 246 engages the multi-sensor system (as described in the step 414 of FIG. 4). The method 500 starts at step 502. At step 504, the method 500 may include monitoring, by the processor 246, the vehicle's engagement with the car wash facility 104. In some aspects, the processor 246 may engage the vehicle sensors (or the vehicle sensory system 232) to monitor the vehicle's engagement. At step 506, the method 500 may include confirming, by the processor 246, hook and pull forces by using the inputs obtained from the vehicle sensory system 232 to monitor the vehicle's engagement. As described above, the processor 246 may obtain inputs from the magnetic sensor, the torque sensor, and/or the microphone to monitor whether the vehicle 102 is engaged with the conveyor 106.

At step 508, the car wash process begins. At step 510, the method 500 may include determining, by the processor 246, the real-time status of the washing process by using the inputs obtained from the vehicle sensory system 232. In further aspects, the processor 246 may perform the determination by using the inputs obtained from the car wash facility 104 via V2X communication. The processor 246 may then output a notification indicating the real-time status, via the infotainment system 238 or the user device 201, as shown in step 512.

The processor 246 may further determine whether the washing process is completed or not (or whether the vehicle 102 is disengaged with the conveyor 106), based on the inputs obtained from the vehicle sensory system 232 and/or the car wash facility 104 (via V2X communication, that signals the end of washing process). Responsive to determining that the washing process is complete, the processor 246 may output another notification indicating that the washing is complete via the infotainment system 238 or the user device 201. In some aspects, the processor 246 may provide real-time animation and status update throughout the washing process. The infotainment system 238 may be coupled with voice and gesture control, allowing the driver to manage the washing process through simple commands, integrating seamlessly with voice recognition systems. The processor 246 may then unlock the vehicle components, when the washing process is complete. For instance, the processor 246 may unlock the gear selector 242 when the washing process is complete, as shown in step 514. Similarly, the processor 246 may enable the operation of the wipers, unfold the side view mirrors, and/or the like. Thereafter, the processor 246 may transfer the control back to the vehicle user/driver, as shown in step 516. The method 500 stops at step 518.

Figure 6:
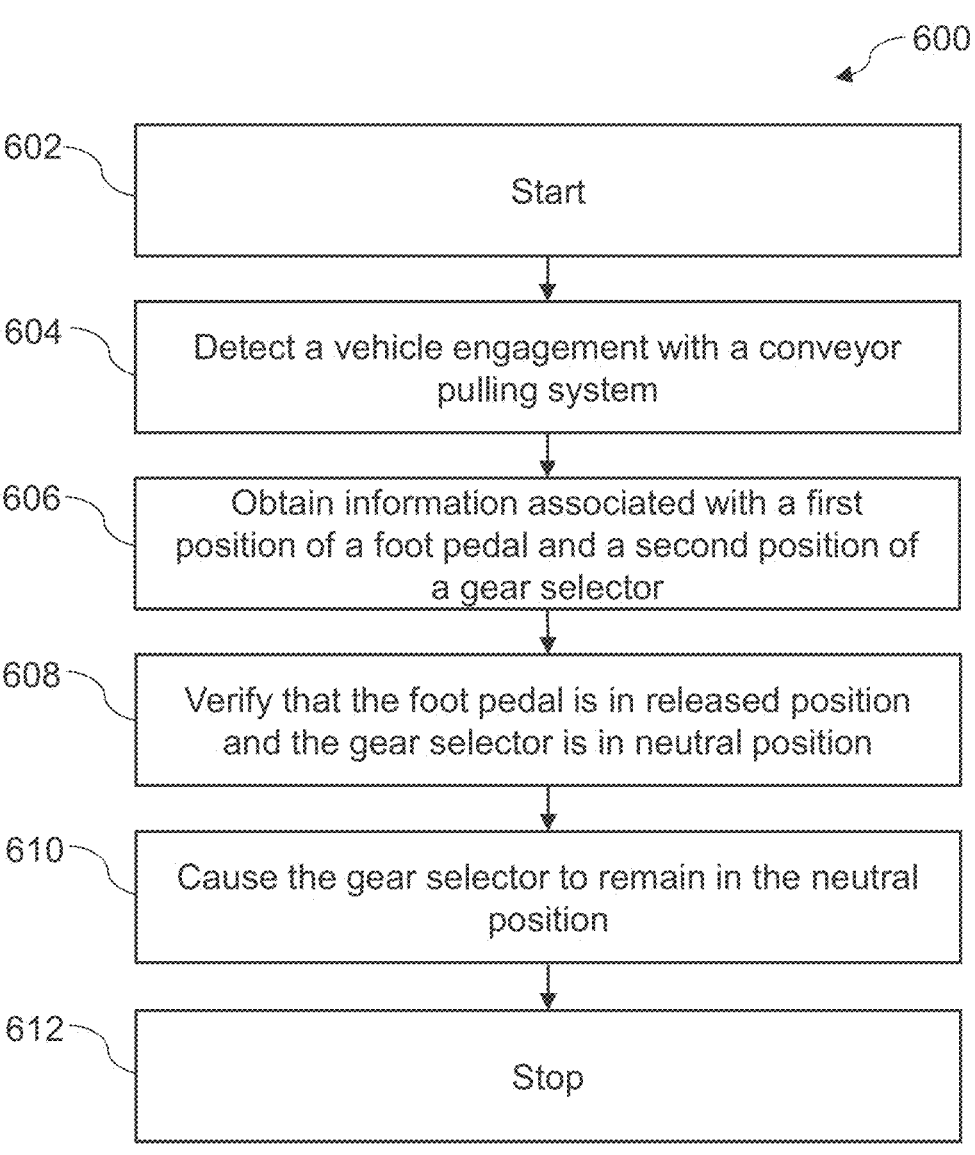
FIG. 6 depicts a flow diagram of a third example method to facilitate washing of a vehicle in accordance with the present disclosure.

FIG. 6 depicts a flow diagram of a third example method 600 to facilitate washing of a vehicle, in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include detecting, by the processor 246, the vehicle engagement with the conveyor 106. At step 606, the method 600 may include obtaining, by the processor 246, information associated with the position of the foot pedal 240 and the position of the gear selector 242 from the vehicle sensory system 232 (e.g., the first sensor and the second sensor), responsive to detecting the vehicle engagement with the conveyor 106.

At step 608, the method 600 may include verifying, by the processor 246, that the foot pedal 240 is in the released position and the gear selector 242 is in the neutral position based on the information. At step 610, the method 600 may include causing, by the processor 246, the gear selector 242 to remain in the neutral position while the vehicle 202 is engaged with the conveyor 106.

At step 612, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a first sensor configured to detect a foot pedal position of a foot pedal;
a second sensor configured to detect a gear selector position of a gear selector; and
a processor coupled to the first sensor and the second sensor, wherein the processor is configured to:
 detect a vehicle engagement with a conveyor pulling system associated with a car wash facility;
 obtain information associated with the foot pedal position and the gear selector position from the first sensor and the second sensor responsive to detecting the vehicle engagement with the conveyor pulling system;
 verify that the foot pedal is in a released position and the gear selector is in a neutral position based on the information; and
 cause, based on verifying that the foot pedal is in the released position and the gear selector is in the neutral position, the gear selector to remain in the neutral position while the vehicle is engaged with the conveyor pulling system.

2. The vehicle of claim 1, wherein the processor is further configured to:
monitor a vehicle location; and
detect that the vehicle is approaching the car wash facility based on the vehicle location.

3. The vehicle of claim 2 further comprising a third sensor configured to capture images of a surrounding area of a vehicle exterior portion, wherein the processor is further configured to:
obtain inputs from the third sensor responsive to detecting that the vehicle is approaching the car wash facility;
verify that the vehicle has entered the car wash facility based on the inputs from the third sensor; and
detect, responsive to verifying that the vehicle has entered the car wash facility, the vehicle engagement with the conveyor pulling system.

4. The vehicle of claim 2 further possessing a transceiver configured to receive inputs from a computing device associated with the car wash facility, wherein the processor is further configured to:
obtain inputs from the transceiver responsive to detecting that the vehicle is approaching the car wash facility;
verify that the vehicle has entered the car wash facility based on the inputs from the transceiver; and
detect, based on verifying that the vehicle has entered the car wash facility, the vehicle engagement with the conveyor pulling system.

5. The vehicle of claim 1 further comprising a magnetic sensor configured to detect magnetic markers on conveyor hooks associated with the conveyor pulling system, wherein the processor is configured to:
obtain first inputs from the magnetic sensor; and
detect the vehicle engagement with the conveyor pulling system based on the first inputs.

6. The vehicle of claim 1 further comprising a torque sensor configured to monitor physical forces involved in a vehicle movement on the conveyor pulling system, wherein the processor is configured to:
obtain second inputs from the torque sensor; and
detect the vehicle engagement with the conveyor pulling system based on the second inputs.

7. The vehicle of claim 1 further comprising a microphone configured to capture sounds associated with the vehicle engagement with the conveyor pulling system, wherein the processor is configured to:
obtain third inputs from the microphone; and
detect the vehicle engagement with the conveyor pulling system based on the third inputs.

8. The vehicle of claim 1, wherein the processor is further configured to:
detect that a washing process of the vehicle has initiated; and
monitor a position of the gear selector responsive to detecting that the washing process has initiated.

9. The vehicle of claim 8, wherein the processor is further configured to:
obtain inputs from a vehicle camera; and
detect that the washing process has initiated based on the inputs obtained from the vehicle camera.

10. The vehicle of claim 9 further comprising at least one of: an infrared spectroscopy sensor, conductivity sensors, or optical flow sensors, wherein the processor is further configured to:
obtain inputs from the at least one of: the infrared spectroscopy sensor, the conductivity sensors, or the optical flow sensors;
detect water and soap conditions based on the inputs obtained from the at least one of: the infrared spectroscopy sensor, the conductivity sensors, or the optical flow sensors; and
detect that the washing process has initiated based on the water and soap conditions.

11. The vehicle of claim 10 further comprising a driver monitoring system configured to capture driver's actions, wherein to cause the gear selector to remain in the neutral position, the processor is configured to:
monitor the driver's actions based on inputs obtained from the driver monitoring system responsive to detecting that the washing process has initiated;
determine that a driver is shifting the gear selector based on the driver's action; and
output a notification for the driver to prevent the shifting of the gear selector.

12. The vehicle of claim 1, wherein to cause the gear selector to remain in the neutral position, the processor is configured to lock the gear selector in the neutral position.

13. The vehicle of claim 12, wherein the processor is further configured to:
obtain inputs associated with dimensions of the car wash facility; and
estimate a length of the conveyor pulling system based on the dimensions.

14. The vehicle of claim 13, wherein the processor is further configured to:
determine a distance traveled by the vehicle inside the car wash facility;
correlate the distance with the length of the conveyor pulling system;
estimate that the vehicle is engaged with the conveyor pulling system based on the correlation; and
lock the gear selector in the neutral position until the vehicle is engaged with the conveyor pulling system.

15. The vehicle of claim 1, wherein the processor is further configured to:

obtain a plurality of trigger signals from a driver to enable shifting of the gear selector; and cause the gear selector to shift responsive to obtaining the plurality of trigger signals.

16. The vehicle of claim 1, wherein the processor is further configured to:

correlate information obtained from the first sensor and the second sensor; and verify that the foot pedal is in the released position and the gear selector is in the neutral position based on the correlation.

17. The vehicle of claim 1, wherein the processor is further configured to:

detect that a washing process of the vehicle is interrupted; and cause the gear selector to re-engage in the neutral position until the washing process is complete, after detecting that the washing process is interrupted.

18. The vehicle of claim 1, wherein the processor is further configured to:

detect a drivetrain configuration of the vehicle; and automatically shift the gear selector to the neutral position responsive to detecting the vehicle engagement with the conveyor pulling system, based on the drivetrain configuration.

19. A method comprising:

detecting, by a processor of a vehicle, a vehicle engagement with a conveyor pulling system associated with a car wash facility;

obtaining, by the processor, information associated with a foot pedal position of a foot pedal and a gear selector position of a gear selector from a first sensor and a second sensor, responsive to detecting the vehicle engagement with the conveyor pulling system;

verifying, by the processor, that the foot pedal is in a released position and the gear selector is in a neutral position based on the information; and causing, by the processor, the gear selector to remain in the neutral position while the vehicle is engaged with the conveyor pulling system, responsive to the verification.

20. A non-transitory computer-readable storage medium having instructions stored thereupon which, when executed by a processor, cause the processor to:

detect a vehicle engagement with a conveyor pulling system associated with a car wash facility;

obtain information associated with a foot pedal position of a foot pedal and a gear selector position of a gear selector from a first sensor and a second sensor, responsive to detecting the vehicle engagement with the conveyor pulling system;

verify that the foot pedal is in a released position and the gear selector is in a neutral position based on the information; and cause, based on verifying that the foot pedal is in the released position and the gear selector is in the neutral position, the gear selector to remain in the neutral position while a vehicle is engaged with the conveyor pulling system.

*     *     *     *     *